United States Patent
Rahunen et al.

(10) Patent No.: US 9,341,219 B2
(45) Date of Patent: May 17, 2016

(54) FIXING INTERFACE FOR A MACHINERY BRAKE, AND A MACHINERY BRAKE

(71) Applicant: KONE Corporation, Helsinki (FI)

(72) Inventors: Janne Rahunen, Valkeakoski (FI); Petri Alkula, Hämeenlinna (FI); Mika Virnes, Hyvinkää (FI); Mika Olkkonen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 124 days.

(21) Appl. No.: 13/946,147

(22) Filed: Jul. 19, 2013

(65) Prior Publication Data

US 2013/0306414 A1 Nov. 21, 2013

Related U.S. Application Data

(63) Continuation of application No. PCT/FI2012/050086, filed on Jan. 31, 2012.

(30) Foreign Application Priority Data

Feb. 15, 2011 (FI) ...................................... 20115145

(51) Int. Cl.
| | |
|---|---|
| F16D 65/00 | (2006.01) |
| B66D 5/02 | (2006.01) |
| F16D 49/00 | (2006.01) |
| F16D 65/42 | (2006.01) |
| F16D 49/16 | (2006.01) |
| F16D 121/22 | (2012.01) |

(52) U.S. Cl.
CPC .......... *F16D 65/00* (2013.01); *B66D 5/02* (2013.01); *F16D 49/00* (2013.01); *F16D 49/16* (2013.01); *F16D 65/0043* (2013.01); *F16D 65/42* (2013.01); *F16D 2121/22* (2013.01); *F16D 2250/0084* (2013.01); *Y10T 29/49004* (2015.01); *Y10T 29/49947* (2015.01)

(58) Field of Classification Search
USPC ..................... 188/74, 184, 186; 187/254, 288
See application file for complete search history.

(56) References Cited

U.S. PATENT DOCUMENTS

| | | | | |
|---|---|---|---|---|
| 2,732,041 | A * | 1/1956 | Anderson | 188/171 |
| 5,007,505 | A * | 4/1991 | Lindegger | 187/254 |
| 5,101,939 | A * | 4/1992 | Sheridan | 188/171 |
| 6,374,964 | B2 * | 4/2002 | Mustalahti et al. | 188/186 |
| 2002/0003070 | A1 | 1/2002 | Mustalahti et al. | |
| 2010/0213016 | A1 * | 8/2010 | Hult et al. | 188/74 |

(Continued)

FOREIGN PATENT DOCUMENTS

| | | |
|---|---|---|
| CN | 101823674 A | 9/2010 |
| FI | 106255 B1 | 12/2000 |
| JP | 2008-037611 A | 2/2008 |

(Continued)

*Primary Examiner* — Christopher Schwartz
(74) *Attorney, Agent, or Firm* — Birch, Stewart, Kolasch & Birch, LLP (57) ABSTRACT

A mechanical fixing interface for fixing a machinery brake in a hoisting machine, a machinery brake, and a method for installing the machinery brake are disclosed. The fixing interface is formed in the frame part of the hoisting machine. The fixing interface includes two fixing surfaces for receiving the fixing lugs of the machinery brake, and between the fixing surfaces is a space for the machinery brake.

17 Claims, 6 Drawing Sheets

(56) References Cited

U.S. PATENT DOCUMENTS

2014/0048359 A1* 2/2014 Olkkonen et al. ........... 188/72.3
2015/0129365 A1* 5/2015 Olkkonen et al. ........... 188/186

FOREIGN PATENT DOCUMENTS

| WO | WO 2005/049473 A1 | 6/2005 |
| WO | WO 2011/004543 A1 | 1/2011 |

* cited by examiner

FIXING INTERFACE FOR A MACHINERY BRAKE, AND A MACHINERY BRAKE

This application is a Bypass Continuation of PCT International Application No. PCT/FI2012/050086 filed on Jan. 31, 2012, which claims priority under 35 U.S.C. §119(a) to Patent Application No. 20115145 filed in Finland on Feb. 15, 2011. The entire contents of each of the above documents is hereby expressly incorporated by reference into the present application.

FIELD OF THE INVENTION

The invention relates to fixing solutions for the brakes of hoisting machines.

BACKGROUND OF THE INVENTION

Elevators generally comprise a holding brake, which is used to keep the elevator car in its position when the car is stopped at a floor level. This same brake is often used also as an emergency brake as required by elevator regulations, which brake is switched on in exceptional situations, such as during an electricity power cut. A drum brake or a disc brake, for example, can be used as a brake.

Conventionally a drum brake is used in elevators, which drum brake comprises at least an active part provided with a brake pad and with an actuator moving the brake pad, and a brake drum connected to the rotor of the hoisting motor in the hoisting machine and rotating along with said rotor, on the outer rim of which brake drum is a braking surface. The drum brake of an elevator generally operates such that when the brake is closed, the spring comprised in the active part of the brake presses the brake shoe and the brake pad connected to it against the braking surface of the brake drum, in which case the elevator car stays in its position. During a run, current is connected to the electromagnet of the brake and the magnet pulls the brake shoe and the brake pad off the braking surface of the brake drum, in which case the brake is open and the elevator car can move up or down in the elevator hoistway. The brake implementation of an elevator can be e.g. such that the implementation comprises two brakes functioning as the active part, which brakes are disposed outside the rim of the brake drum on opposite sides of the rim of the brake drum to each other as viewed from the front in the direction of the axis of rotation of the brake drum.

The force acting on the brake drum of a drum brake when the brake engages is quite large, owing to which the brake wheel absorbs a lot of kinetic energy. This produces a loud noise when the brake pad hits against the brake drum. To solve this problem the aim has been for the air gap between the brake pad and the brake drum to be as small as possible. In this case the brake pad does not have time to achieve very great speed and kinetic energy when it hits the brake drum, as a result of which the impact is more subdued. An air gap that is small enough is, however, difficult to implement and also to adjust, and this type of solution results in a very fragile structure and also in extremely precise manufacturing tolerances. Another problem is that brake pads wear over the course of time, in which case the air gap between the brake pad and the brake drum increases. When the air gap between the brake pad and the brake drum increases, the movement of the brake pad also increases and therefore the noise caused by the operation of the brake becomes louder. The air gap of the electromagnet of the brake also increases as the brake pad wears. As the air gap increases, the attractive force produced by the electromagnet decreases, in which case the operation of the brake slows down and the brake does not even open properly.

Nowadays the adjustment and installation of machinery brakes are performed on the production line of the hoisting machine manually. It would be advantageous to find a solution wherein the adjustment/installation of machinery brakes could be at least partly automated. In addition, it would be advantageous to find a simpler solution than the known one for adjusting the air gap between the brake pad and the brake drum for reducing the noise nuisance caused by the wearing of a brake pad.

AIM OF THE INVENTION

The aim of the invention is to solve the aforementioned drawbacks. To achieve this aim the invention discloses a mechanical fixing interface according to claim 1, a machinery brake according to claim 8, a method according to claim 13, a method according to claim 14 and also a method according to claim 15. The preferred embodiments of the invention are described in the dependent claims. Some inventive embodiments and inventive combinations of the various embodiments are also presented in the descriptive section and in the drawings of the present application.

SUMMARY OF THE INVENTION

The invention relates to a mechanical fixing interface for fixing a machinery brake in a hoisting machine. The fixing interface is formed in the frame part of the hoisting machine. The fixing interface comprises two fixing surfaces for receiving the fixing lugs of the machinery brake, and between the fixing surfaces is a space for the machinery brake.

In a preferred embodiment of the invention the fixing interface comprises two recesses that are disposed on opposite sides of the space reserved for the machinery brake for receiving the fixing lugs of the machinery brake, and on the base of both recesses is a fixing surface, against which the fixing lug presses. In a preferred embodiment of the invention the aforementioned recess comprises a side wall and a base.

In the most preferred embodiment of the invention the side walls of the recesses, the fixing surfaces and also the space made between the recesses for the machinery brake together bound the housing left open for the machinery brake in the direction of the axis of rotation of the hoisting machine.

In one embodiment of the invention holes for the fixing means are made in the fixing surfaces.

In a preferred embodiment of the invention a rear wall is formed in the aforementioned recesses that are disposed on opposite sides of the space reserved for the machinery brake, and the rear wall and side wall of the recess together position the fixing lug on the fixing surface.

The invention also relates to a machinery brake, which comprises a frame part and also a brake shoe movably supported on the frame part. The frame part of the machinery brake is provided with fixing lugs, which are disposed on opposites sides of the frame part, and the machinery brake is configured to be fixed from the fixing lugs to the fixing interface according to the invention.

In a preferred embodiment of the invention the bottom surface of the fixing lug is configured to press against the fixing surface.

In a preferred embodiment of the invention the top surface of the fixing lug is lowered from the level of the top surface of the frame part of the machinery brake such that in a machinery brake that is fixed into its position the top surface of the frame part of the machinery brake is situated farther from the frame part of the hoisting machine than the top surface of the fixing lug.

In a preferred embodiment of the invention, the fixing lug comprises a tongue, which, in a fixing lug that is positioned into its position in the recess, extends outside the recess to beside the side wall of the recess.

In a preferred embodiment of the invention, the fixing surface comprises a locating pin for positioning the fixing lug onto the fixing surface, and the fixing lug comprises a groove for the locating pin.

The invention also relates to a method for installing a machinery brake into a fixing interface according to the invention. The fixing lug of the machinery brake comprises a tongue which, in a fixing lug that is positioned into its position in the recess, extends outside the recess to beside the side wall of the recess. In the method the hoisting machine is tilted such that the axis of rotation of the rotor of the hoisting machine turns with respect to the horizontal plane, the frame part of the machinery brake is lowered from the upper direction into the mechanical fixing interface to rest on the tongues on the fixing lugs of the machinery brake by guiding the fixing lugs into the recesses in the fixing interface that are disposed on opposite sides of the space reserved for the machinery brake, and also the fixing lugs are tightened against the fixing surfaces in the recesses with fixing means.

In one method according to the invention a rear wall is formed in the aforementioned recesses in the fixing interface, and the rear wall and side wall of the recess together position the fixing lug on the fixing surface. In the method the hoisting machine is tilted such that the axis of rotation of the rotor of the hoisting machine turns with respect to the horizontal plane, the frame part of the machinery brake is lowered from the upper direction into the mechanical fixing interface by guiding the fixing lugs into the aforementioned recesses in the fixing interface such that the fixing lugs press against the rear walls of the recesses and also the fixing lugs are tightened against the fixing surfaces in the recesses with fixing means.

In one method according to the invention the fixing surface comprises a locating pin for positioning the fixing lug. In addition, the fixing lug comprises a groove for the locating pin. In the method the hoisting machine is tilted such that the axis of rotation of the rotor of the hoisting machine turns with respect to the horizontal plane, the frame part of the machinery brake is lowered from the upper direction into the mechanical fixing interface by guiding the fixing lugs onto the locating pins on the fixing surfaces such that the locating pins press into the locating grooves in the fixing lugs and also the fixing lugs are tightened against the fixing surfaces with fixing means.

In a preferred embodiment of the invention, at least one shim is fitted between the bottom surface of the fixing lug and the fixing surface for increasing the air gap between the braking surface of the brake pad of the machinery brake and the braking surface of the rotating part of the hoisting machine.

In a preferred embodiment of the invention the magnitude of the air gap between the braking surface of the brake pad of the machinery brake and the braking surface of the rotating part of the hoisting machine is determined. In the most preferred embodiment of the invention the machinery brake is controlled open by supplying current to the electromagnet in the frame part of the machinery brake and the magnitude of the air gap between the braking surface of the brake pad of the machinery brake and the braking surface of the rotating part of the hoisting machine is measured when the machinery brake has been controlled open. After this the determined magnitude of the air gap between the braking surface of the brake pad of the machinery brake and the braking surface of the rotating part of the hoisting machine is compared to the reference value for the air gap, and on the basis of the comparison one or more shims is/are removed from between the bottom surface of the fixing lug and the fixing surface such that the air gap between the braking surface of the brake pad and the braking surface of the rotating part of the hoisting machine approaches the reference value for the air gap.

In a preferred embodiment of the invention the machinery brake is controlled open by supplying current to the electromagnet in the frame part of the machinery brake, one or more fixing means is/are opened for reducing the tightening force between the fixing lug and the fixing surface, the machinery brake is activated by disconnecting the current supply of the electromagnet when the fixing means has/have been opened and one or more shims is/are removed from between the bottom surface of the fixing lug and the fixing surface, when the fixing means has/have been opened and the machinery brake has been activated. After one or more shims has/have been removed from between the bottom surface of the fixing lug and the fixing surface the machinery brake is again controlled open and after this the fixing lug is tightened against the fixing surface with one or more fixing means.

By means of the solution according to the invention the distance between the braking surface of the brake pad and the braking surface of the rotating part of the hoisting machine can be adjusted easily and accurately always when an adjustment need is detected, as a consequence of, among other things, wearing of the brake pad. With the fixing lugs according to the invention, good space efficiency is achieved when opening and tightening the fixing means, such as fixing bolts.

The solution according to the invention meets the requirements set by an automation line of a hoisting machine, so that the assembly of the brake, and if necessary adjustment of the brake occurring in connection with assembly, can be automated.

Since in the solution according to the invention the brake is a close-fitting part of the frame of the motor, the brake and its fixing lugs also function as a force-bearing element, thereby stiffening the hoisting machine.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
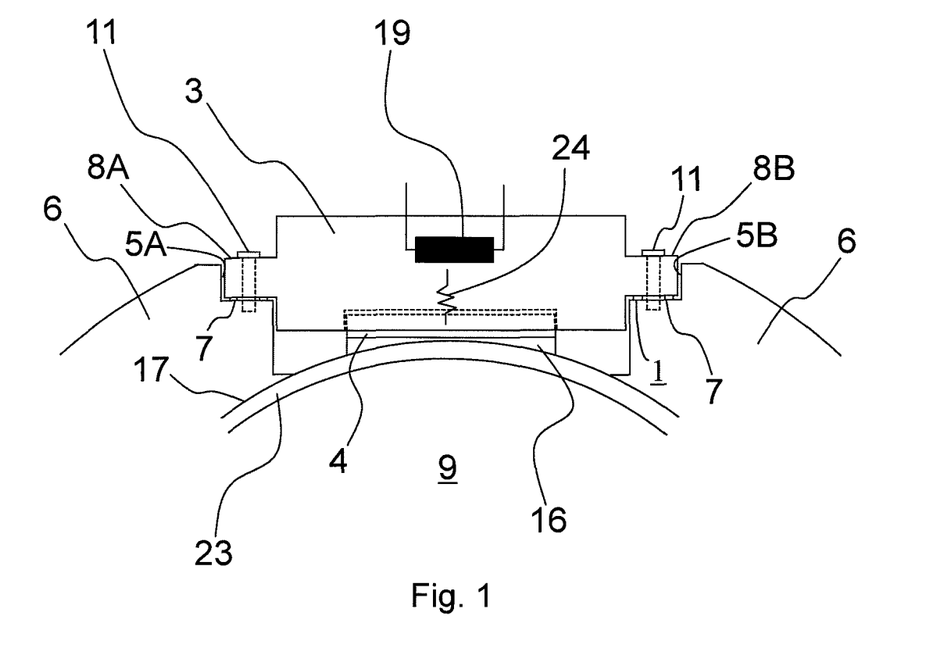
FIG. 1 presents a machinery brake according to the invention, as viewed directly from the front from the direction of the axis of rotation of the hoisting machine, when fixed to a fixing interface according to the invention

FIG. 1 presents a part of an elevator hoisting machine according to the invention as viewed from the front, i.e. as viewed in the direction of the axis of rotation 22 of the hoisting machine, said part being described upwards from the axis of rotation in the direction of the radius, which hoisting machine comprises at least a hoisting motor, remaining hidden behind other parts in the figure, a frame part 6 and a traction sheave 9 rotated by the hoisting motor, to which traction sheave a brake drum 23 provided with a cylindrical braking surface 17 configured to rotate along with the traction sheave 9 is connected. The hoisting machine also comprises at least two brakes 2 (in FIG. 1 for the sake of simplicity only of the brakes is presented), which are similar and to be fixed in the same manner, fitted to the brake drum 23 for achieving a braking effect with friction, which brakes 2 are disposed on the outer rim of the brake drum 23 on opposite sides of the brake drum 23 to each other as viewed in the direction of the axis of rotation 22 of the brake drum 23. The brake 2 comprises a frame part 3 and also a brake shoe 4 movably supported on the frame part, to which brake shoe a brake pad 16 is attached. Between the frame part 3 and the brake shoe 4 are thruster springs 24, which exert a thrusting force between the frame part 3 and the brake shoe 4. The frame part comprises an electromagnet, the current flowing in the magnetizing coil 19 of which produces a force of attraction between the frame part 3 and the brake shoe 4/brake pad 16. The electromagnet is configured to open the brake by pulling the brake pad 16 off the braking surface 17 of the brake drum by resisting the thrusting force produced by the thruster springs 24. When the current supply of the magnetizing coil 19 is disconnected, the force of attraction of the electromagnet ceases and the brake is activated. In this case, when the force of attraction of the electromagnet has decreased to below the thrusting force produced by the thruster springs 24, the thruster springs press the brake pad 16 onto the braking surface 17 of the drum brake to brake the movement of the traction sheave 9.

Figure 2:
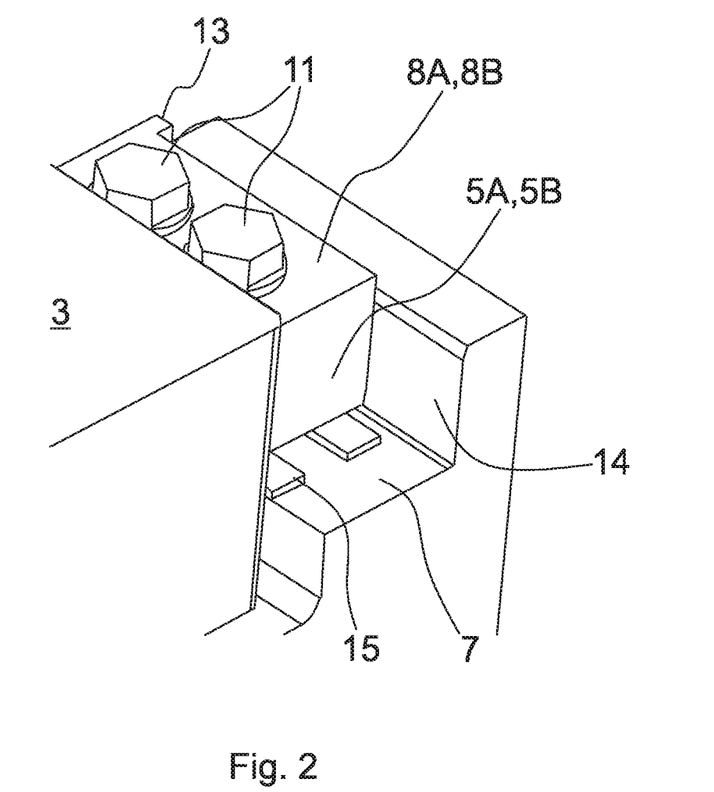
FIG. 2 presents an oblique bottom view of a machinery brake according to FIG. 1 in a fixing interface according to FIG. 1, when the hoisting machine has been tilted

Both of the brakes 2 are provided with fixing lugs 8A, 8B, which are disposed on opposite sides of the frame part 3 of the brake. The brake 2 is fixed with the fixing lugs 8A, 8B to the fixing interface 1 in the frame part 6 of the hoisting machine. Two recesses 5A, 5B that are situated on opposite sides of the space reserved for the brake 2 are machined in the fixing interface 1 for both brakes 2, and the fixing lugs 8A, 8B are fitted into the aforementioned recesses 5A, 5B. FIG. 2 presents in more detail one of the recesses 5A, 5B in the fixing interface 1 of FIG. 1. The recess 5A, 5B comprises a side wall 14 and also a base, which comprises a fixing surface 7, against which the fixing lug 8A, 8B presses. In the recess between the bottom surface of the fixing lug 8A, 8B and the fixing surface 7 are one or more shims 15, by increasing or removing which shims the distance, i.e. the air gap, between the braking surfaces of the brake pad 16 and of the brake drum 23 can be adjusted, when the brake has been controlled open.

A space is made in the fixing interface 1 between the recesses 5A, 5B, into which space the brake 2 is fitted. The side walls 14 of the recesses 5A, 5B, the fixing surfaces 7 and also the space made between the recesses 5A, 5B for the machinery brake 2 together bound the housing left open, in the direction of the axis of rotation 22, for the machinery brake 2 and for the fixing lugs 8A, 8B. This housing, which is open in the presentation direction of FIG. 1, enables installation of a machinery brake 2 into the hoisting machine from the direction of the axis of rotation 22.

In the following the installation process of a machinery brake will be described in more detail.

Figure 5A:
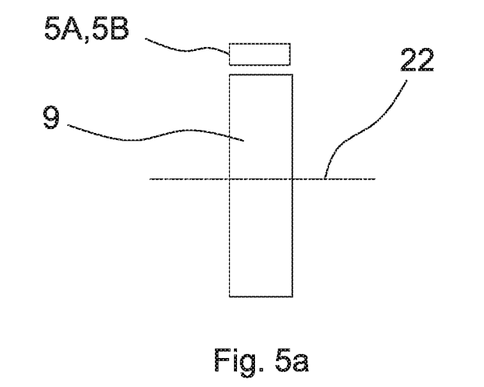
FIGS. 5a, 5b illustrate the installation procedure of a machinery brake
Figure 5B:
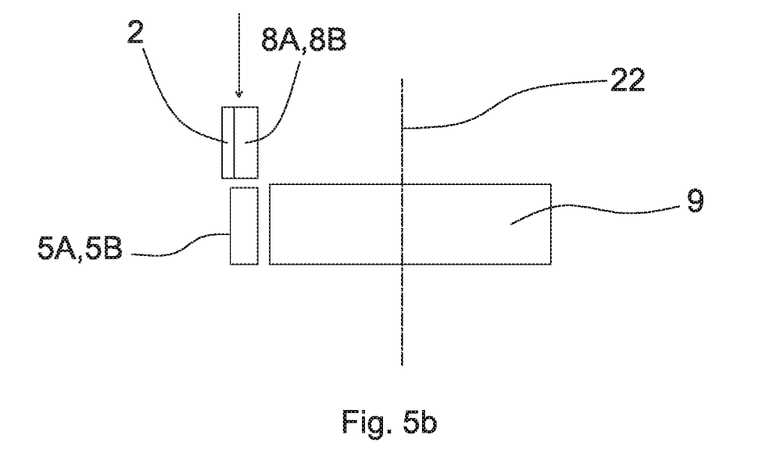

FIGS. 5a, 5b illustrate the automatic assembly of a hoisting machine according to FIG. 1 in respect of the installation of the brake. For the purpose of the automatic assembly line, the hoisting machine of FIG. 1 is tilted such that the axis of rotation 22 of the hoisting machine, which axis is disposed in the horizontal direction in FIGS. 1 and 5a, is turned into the vertical direction, according to FIG. 5b. The brake 2 is lowered from above (i.e. from the viewing direction of FIG. 1) into the fixing interface 1 by guiding the fixing lugs 8A, 8B into the recesses 5A, 5B of the fixing interface. The installation direction is presented in FIG. 5b with an arrow.

In one embodiment of the invention the fixing lugs 8A, 8B comprise the tongues 13 presented in FIG. 2, which tongues, in a fixing lug 8A, 8B that is in a recess 5A, 5B, extend outside the recess 5A, 5B to beside the side wall 14 of the recess. The machinery brake is lowered from above to rest on these tongues 13 on the fixing lugs 8A, 8B by guiding the fixing lugs 8A, 8B into the recesses 5A, 5B.

Figure 4:
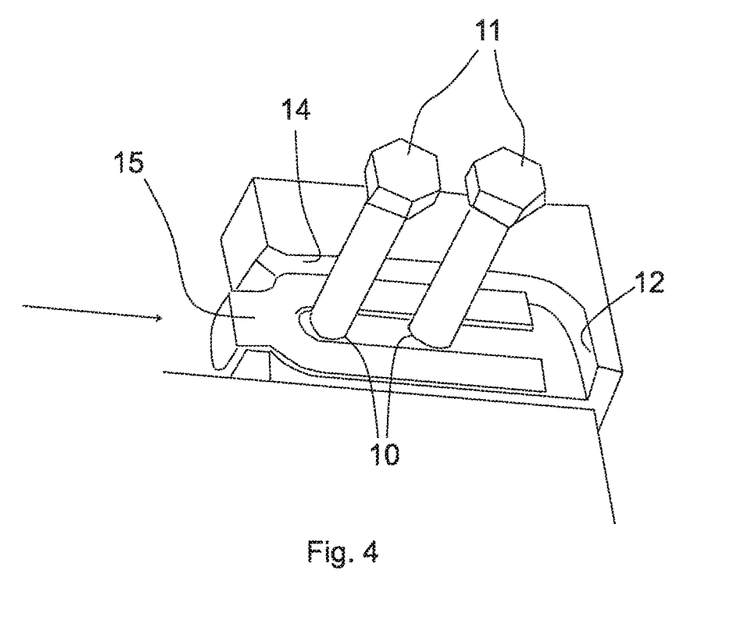
FIG. 4 presents a recess, in the fixing interface, for receiving a fixing lug

FIG. 4 presents a second fixing interface, which is suited for use also in the embodiment of FIG. 1. In this, rear walls 12 have been formed in the recesses 5A, 5B of the fixing interface 11, in the manner presented in FIG. 4. In this case when lowering the machinery brake according to FIG. 1 into the fixing interface 1 (direction of the arrow in FIG. 4) from above according to FIG. 5b, the fixing lugs 8A, 8B press against the rear wall 12 of the recess 5A, 5B, such that the rear wall 12 and side wall 14 of the recess together position the fixing lug 8A, 8B on the fixing surface 7.

Figure 6:
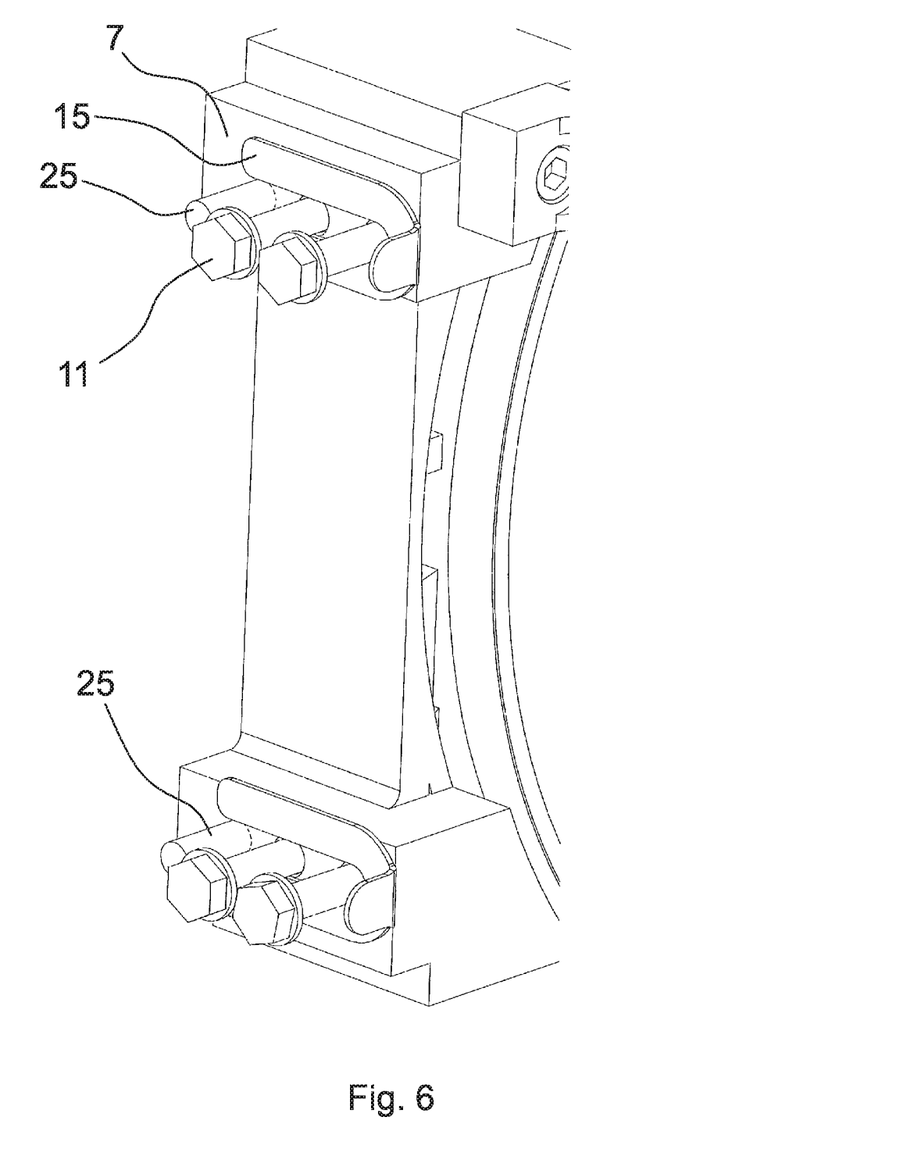
FIG. 6 presents one fixing surface according to the invention
Figure 7:
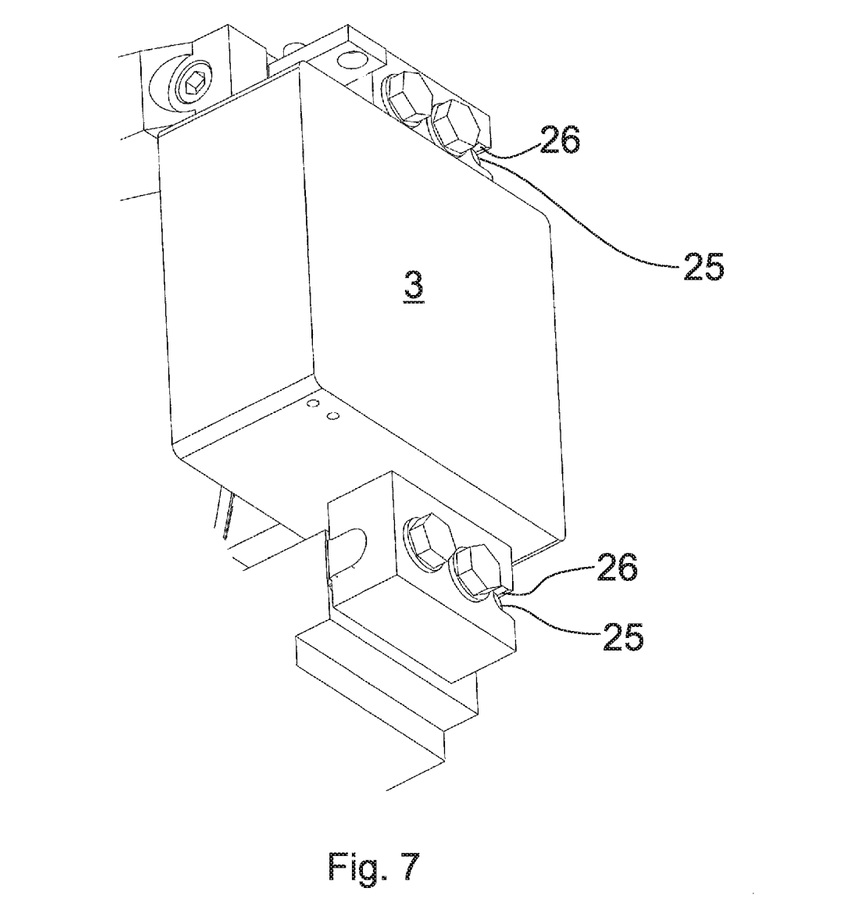
FIG. 7 presents a fixing lug according to the invention

FIG. 6 presents a third fixing interface, which is suited also for using for the fixing of a brake 2 according to FIG. 1. FIG. 7 presents a fixing lug 8A, 8B, which is intended to be fixed to a fixing interface according to FIG. 6. The fixing surface 7 according to FIG. 6 comprises a locating pin 25 for positioning the fixing lug 8A, 8B onto the fixing surface 7. Correspondingly, the fixing lug 8A, 8B comprises a locating groove 26. The machinery brake 2 is lowered from above into the fixing interface 1 by guiding the fixing lugs 8A, 8B onto the locating pins 25 on the fixing surfaces 7 such that the locating pins 25 press into the locating grooves 26 in the fixing lugs 8A, 8B; FIG. 7 presents the fixing lugs 8A, 8B lowered into their position resting on a locating pin 25.

Before fixing the brake 2, the interface dimensions of the brake 2 are measured and the correct number of shims for optimizing the air gap between the brake pad 16 and the brake drum 23 is calculated. Shims 15 are placed between the bottom surface of the fixing lug 8A, 8B and the fixing surface 7, after which the fixing lugs 8A, 8B are tightened with the bolts 11. Holes for bolts 11 are made in the fixing lugs 8A, 8B and in the fixing surfaces 7.

The brake pads 16 gradually wear as a consequence of use of the brake 2. As a consequence of wearing of the brake pads, the air gap between the braking surface of the brake pad 16 and the braking surface 17 of the brake drum increases. When the air gap increases, the noise of the brake when the brake pad hits against the braking surface 17 of the brake drum becomes louder. Likewise, the noise of the brake when the brake opens becomes louder, when the brake shoe 4 and the frame part 3 of the brake hit against each other. For this reason, the air gap of the brake 2 must be adjusted, when necessary, also after commissioning of the hoisting machine. In the following this adjustment process of the air gap of a machinery brake according to FIG. 1 will be described in more detail.

Figure 3:
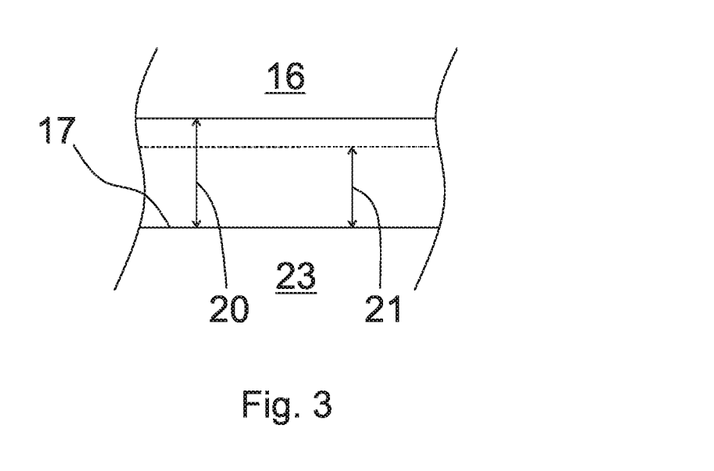
FIG. 3 illustrates the air gap between the braking surface of the brake pad and the braking surface of the brake drum as well as some concepts of the reference value of the air gap

For the start of the adjustment process of the air gap, the machinery brake 2 is controlled open by supplying current to the coil 19 of the electromagnet in the frame part 3 of the machinery brake. When the machinery brake 2 has been controlled open, the magnitude of the air gap between the brake pad 16 of the machinery brake and the braking surface 17 of the brake drum is measured. After this the measured air gap is compared to the reference value for the air gap, and on the basis of the comparison the necessary quantity of shims 15 is removed from between the bottom surface of the fixing lug 8A, 8B and the fixing surface 7 such that the air gap between the braking surface of the brake pad 16 and the braking surface 17 of the brake drum approaches the reference value for the air gap. For illustrating the matter, FIG. 3 presents the air gap 20 between the braking surface of the brake pad 16 and the braking surface 17 of the brake drum 23, when the brake has been controlled open. According to FIG. 3, the air gap 20 has increased owing to wear of the brake pad 16 to become larger than the reference value 21 for the air gap, which is noticed as a loudening of the noise caused by operation of the brake. For this reason the quantity of shims according to the difference of the air gap 20 and the reference value 21 for the air gap is removed from between the bottom surface of the fixing lug 8A, 8B and the fixing surface 7, in which case the air gap 20 returns to essentially the reference value 21. Removal of a shim/shims 15 from between the fixing lug 8A, 8B and the fixing surface 7 occurs as follows: when the brake 2 has been controlled open, the bolts 11 of the fixing lug are opened. When the bolts 11 have been opened, the machinery brake 2 is activated by disconnecting the current supply to the coil 19 of the electromagnet. When the brake 2 is activated, the thruster springs 24 push the brake pad 16 against the braking surface 17 of the brake drum and at the same time the frame part 3 of the brake presses upwards against the bolts 11, in which case the bottom surface of the fixing lug 8A, 8B and the braking surface 7 draw apart from each other and removal of shims from between them is possible. The calculated quantity of shims is then removed from between the bottom surface of the fixing lug 8A, 8B and the braking surface 7. After removal of the shims, the machinery brake is again controlled open, and the fixing lug 8A, 8B is tightened against the fixing surface 7 with the bolts 11.

As presented in FIG. 1, the top surface of the fixing lug 8A, 8B is lowered from the level of the top surface of the frame part 3 of the machinery brake such that the top surface of the frame part 3 of the machinery brake is situated farther from the frame part 6 of the hoisting machine than the top surface of the fixing lug 8A, 8B. In this way working space remains above the heads of the fixing bolts 11 for tightening/loosening the bolts.

The invention is described above as applied in connection with a drum brake. However, the invention is also suited for use e.g. in, inter alia, disc brakes.

It is obvious to the person skilled in the art that the invention is not limited solely to the example described above, but that it may be varied within the scope of the claims presented below. Thus, for example, the fixing and the structure of the adjustment means may differ from those presented above.

The invention claimed is:

1. A machinery brake, comprising a frame part and a brake shoe movably supported on the frame part, wherein the frame part of the machinery brake is provided with fixing lugs, which are disposed on opposites sides of the frame part, and the machinery brake is configured to be fixed from the fixing lugs to a mechanical fixing interface, the mechanical fixing interface comprising:
two fixing surfaces, formed on two opposite sides of the mechanical fixing interface, for receiving fixing lugs of the machinery brake, wherein a space is defined between the two fixing surfaces for receiving the machinery brake;
two sidewalls respectively formed on the two fixing surfaces, on two opposite ends of the mechanical fixing interface, to define two recesses for receiving the fixing lugs of the machinery brake; and
two rear walls formed on a rear side of the mechanical fixing interface, each of the two rear walls joining a respective side wall on each side of the mechanical fixing interface, defining a corner for each recess for positioning one of the fixing lugs on each fixing surface,
wherein each fixing lug comprises a groove for a locating pin.

2. The machinery brake according to claim 1, wherein each fixing lug comprises a tongue extending outside the recess to beside the side wall of the recess.

3. A method for installing a machinery brake in a hoisting machine, comprising the steps of:
providing a fixing interface formed in a frame part of the hoisting machine, the fixing interface comprising two fixing surfaces for receiving fixing lugs of the machinery brake, a space being defined between the two fixing surfaces for receiving the machinery brake;
providing the machinery brake according to claim 2;
tilting the hoisting machine such that the axis of rotation of the hoisting machine turns with respect to the horizontal plane;
lowering the machinery brake from the upper direction into the mechanical fixing interface to rest on the tongues on the fixing lugs of the machinery brake by guiding the fixing lugs into the recesses in the fixing interface; and
tightening the fixing lugs against the fixing surfaces in the recesses with a fixing device.

4. The method according to claim 3, further comprising the step of:
determining the magnitude of the air gap between the braking surface of the brake pad of the machinery brake and the braking surface of the rotating part of the hoisting machine.

5. The method according to claim 4, further comprising the steps of:
comparing the magnitude of the air gap between the braking surface of the brake pad of the machinery brake and the braking surface of the rotating part of the hoisting machine to the reference value for the air gap; and
on the basis of the comparison, removing one or more shims from between the bottom surface of the fixing lug and the fixing surface such that the air gap between the braking surface of the brake pad and the braking surface of the rotating part of the hoisting machine approaches the reference value for the air gap.

6. The method according to claim 5, further comprising the steps of:
controlling the machinery brake to open by supplying current to the electromagnet in the frame part of the machinery brake;
opening one or more fixing devices for reducing the tightening force between the fixing lug and the fixing surface;
activating the machinery brake by disconnecting the current supply of the electromagnet when the one or more fixing devices have been opened; and
removing one or more shims from between the bottom surface of the fixing lug and the fixing surface, when the one or more fixing devices have been opened and the machinery brake has been activated.

7. The method according to claim 6, further comprising the steps of:
- controlling the machinery brake to open when the one or more shims have/has been removed from between the bottom surface of the fixing lug and the fixing surface; and
- tightening the fixing lug against the fixing surface with one or more fixing devices when the machinery brake has been controlled to open.

8. The method according to claim 4, further comprising the steps of:
- controlling the machinery brake to open by supplying current to the electromagnet in the frame part of the machinery brake; and
- measuring the magnitude of the air gap between the braking surface of the brake pad of the machinery brake and the braking surface of the rotating part of the hoisting machine when the machinery brake has been controlled to open.

9. The method according to claim 3, further comprising the step of:
- fitting at least one shim between the bottom surface of the fixing lug and the fixing surface for increasing the air gap between the braking surface of the brake pad of the machinery brake and the braking surface of the rotating part of the hoisting machine.

10. The machinery brake according to claim 1, further comprising two fixing bolts, wherein each of the two fixing surfaces include a hole extending beyond the fixing surface for receiving one fixing bolt configured to fix the fixing lug of the machinery brake to the fixing surface by penetrating beyond the fixing surface.

11. The machinery brake according to claim 10, further comprising a locating pin formed on each of the two fixing surfaces for positioning the fixing lug onto the fixing surface.

12. The machinery brake according to claim 1, wherein a bottom surface of each fixing lug is configured to press against the fixing surface.

13. The machinery brake according to claim 12, wherein a top surface of the fixing lug is lower than a top surface of the frame part of the machinery brake with respect to the brake shoe.

14. A method for installing a machinery brake in a hoisting machine, comprising the steps of:
- providing a fixing interface formed in a frame part of the hoisting machine, the fixing interface comprising two fixing surfaces for receiving fixing lugs of the machinery brake, a space being defined between the two fixing surfaces for receiving the machinery brake, the fixing interface comprises two recesses that are disposed on opposite sides of the space for the machinery brake for receiving the fixing lugs of the machinery brake, and on bases of both recesses are the two fixing surfaces, against which the fixing lug presses, wherein a rear wall is formed in the recesses, and the rear wall and side wall of the recess together position the fixing lug on the fixing surface;
- providing the machinery brake according to claim 1;
- tilting the hoisting machine such that the axis of rotation of the hoisting machine turns with respect to the horizontal plane;
- lowering the machinery brake from the upper direction into the mechanical fixing interface by guiding the fixing lugs into the recesses in the fixing interface, such that the fixing lugs press against the rear walls of the recesses; and
- tightening the fixing lugs against the fixing surfaces in the recesses with a fixing device.

15. A method for installing a machinery brake in a hoisting machine, comprising the steps of:
- providing a fixing interface formed in a frame part of the hoisting machine, the fixing interface comprising two fixing surfaces for receiving fixing lugs of the machinery brake, a space being defined between the two fixing surfaces for receiving the machinery brake, wherein the fixing surface comprises a locating pin for positioning the fixing lug onto the fixing surface;
- providing the machinery brake according to claim 1;
- tilting the hoisting machine such that the axis of rotation of the hoisting machine turns with respect to the horizontal plane;
- lowering the machinery brake from the upper direction into the mechanical fixing interface by guiding the fixing lugs onto the locating pins on the fixing surfaces, such that the locating pins press into the locating grooves in the fixing lugs; and
- tightening the fixing lugs against the fixing surfaces with a fixing device.

16. The machinery brake according to claim 1, wherein the side walls of the recesses, the fixing surfaces and also the space made between the recesses for the machinery brake together bound the housing left open for the machinery brake in a direction of an axis of rotation of the hoisting machine.

17. A machinery brake, comprising a frame part and a brake shoe movably supported on the frame part, wherein the frame part of the machinery brake is provided with fixing lugs, which are disposed on opposites sides of the frame part, and the machinery brake is configured to be fixed from the fixing lugs to a mechanical fixing interface, the mechanical fixing interface comprising:
- two fixing surfaces, formed on two opposite sides of the mechanical fixing interface, for receiving fixing lugs of the machinery brake, wherein a space is defined between the two fixing surfaces for receiving the machinery brake;
- two sidewalls respectively formed on the two fixing surfaces, on two opposite ends of the mechanical fixing interface, to define two recesses for receiving the fixing lugs of the machinery brake; and
- two rear walls formed on a rear side of the mechanical fixing interface, each of the two rear walls joining a respective side wall on each side of the mechanical fixing interface, defining a corner for each recess for positioning one of the fixing lugs on each fixing surface,
- wherein each fixing lug comprises a tongue extending outside the recess to beside the side wall of the recess.

* * * * *